US005479516A

United States Patent [19]

Damato et al.

[11] Patent Number: 5,479,516

[45] Date of Patent: Dec. 26, 1995

[54] LOUDSPEAKER DEMONSTRATING

[75] Inventors: Joseph A. Damato, Shrewsbury, Mass.; Michael Crall, Corona Del Mar, Calif.

[73] Assignee: Bose Corporation, Framingham, Mass.

[21] Appl. No.: 61,202

[22] Filed: May 13, 1993

[51] Int. Cl.[6] .............................. H04B 3/00; H04R 5/00; H04R 25/00

[52] U.S. Cl. ............................. 381/81; 381/82; 381/188; 381/205; 381/24

[58] Field of Search ............................. 381/81, 188, 205, 381/87, 24, 82; 364/188, 146, 401; 434/365, 367

[56] References Cited

U.S. PATENT DOCUMENTS

| | | | |
|---|---|---|---|
| 5,036,472 | 7/1991 | Buckley et al. | 364/479 |
| 5,127,057 | 6/1992 | Chapman | 381/86 |

*Primary Examiner*—Curtis Kuntz
*Assistant Examiner*—Sinh Tran
*Attorney, Agent, or Firm*—Fish & Richardson

[57] ABSTRACT

An automated display demonstrates a loudspeaker in response to selections by a potential customer. The display permits accessible storage of the demonstrating loudspeakers.

7 Claims, 3 Drawing Sheets

LOUDSPEAKER DEMONSTRATING

BACKGROUND OF THE INVENTION

This invention relates to loudspeaker demonstrating.

SUMMARY OF THE INVENTION

According to the invention, loudspeaker demonstrating apparatus includes a disc having a plurality of selectable tracks. A disc player supports the disc and plays selected ones of the selectable tracks. The disc player has a track selection signal input for receiving track selection signals designating a selectable track to be played. There is at least one loudspeaker. An amplifier is coupled to the disc player. A controller has a plurality of switches. A first of the switches is coupled to the controller and selectively connects the at least one loudspeaker to the amplifier. The controller also has at least a second switch upon actuation causing the controller to provide a tract selection signal to the disc player to select a predetermined one of the selectable tracts for playing by the disc player to reproduce the signal recorded on the latter track by the at least one loudspeaker. The controller provides an initial track selection signal to the disc player selecting an initial selectable track on the disc for playing by the disc player for reproduction by the at least one loudspeaker in the absence of selection of any others of the selectable tracks.

Other features, objects, and advantages will become apparent from the following description when read in connection with the accompanying drawings in which:

DETAILED DESCRIPTION

Figure 1:
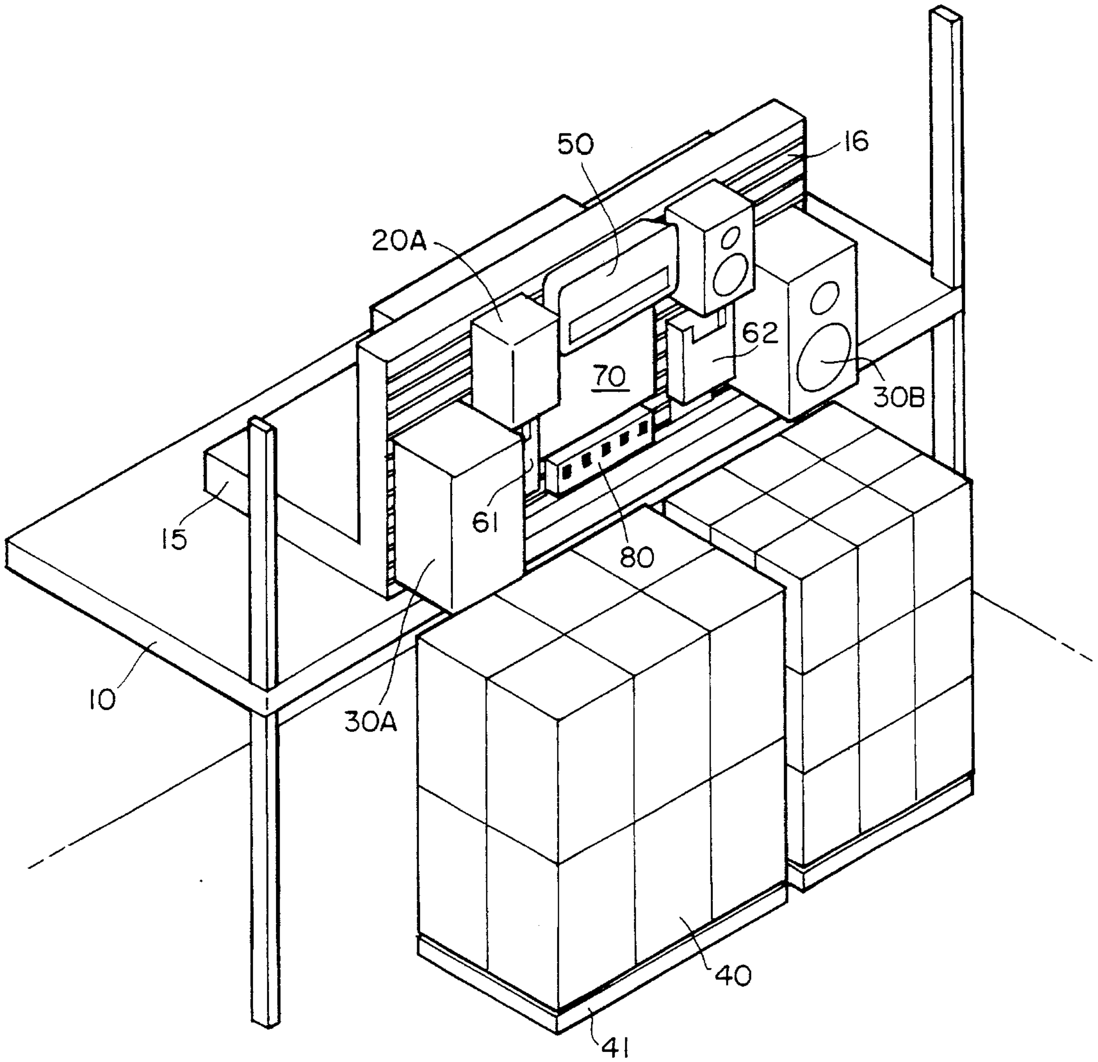
FIG. 1 is a perspective view of an interactive automated loudspeaker demonstration.

With reference now to the drawings and more particularly to FIG. 1, there is shown a perspective view of an automated loudspeaker demonstrator according to the invention. A platform 10 carries support 15. Face 16 of support 15 carries loudspeaker pairs 20A and 20B, 30A and 30B. Platform 10 is typically 64 inches high and 11 feet wide, permitting product in cartons 40 to be stacked underneath platform 10 on pallets 41, 42, each pallet holding product corresponding to one of the loudspeaker pairs. A sign 50, which may be lighted, is mounted on support face 16 to attract consumers to the automated display. Literature holders 61, 62 accommodate product literature. A panel 70 typically 22 inches wide and 17 inches high graphically displays information. An automated switching unit 80 has large LED push-buttons for actuation by consumers in selecting demonstrations. The height of the panel, literature holders, and buttons are typically at eye level of a standing consumer.

Figure 2:
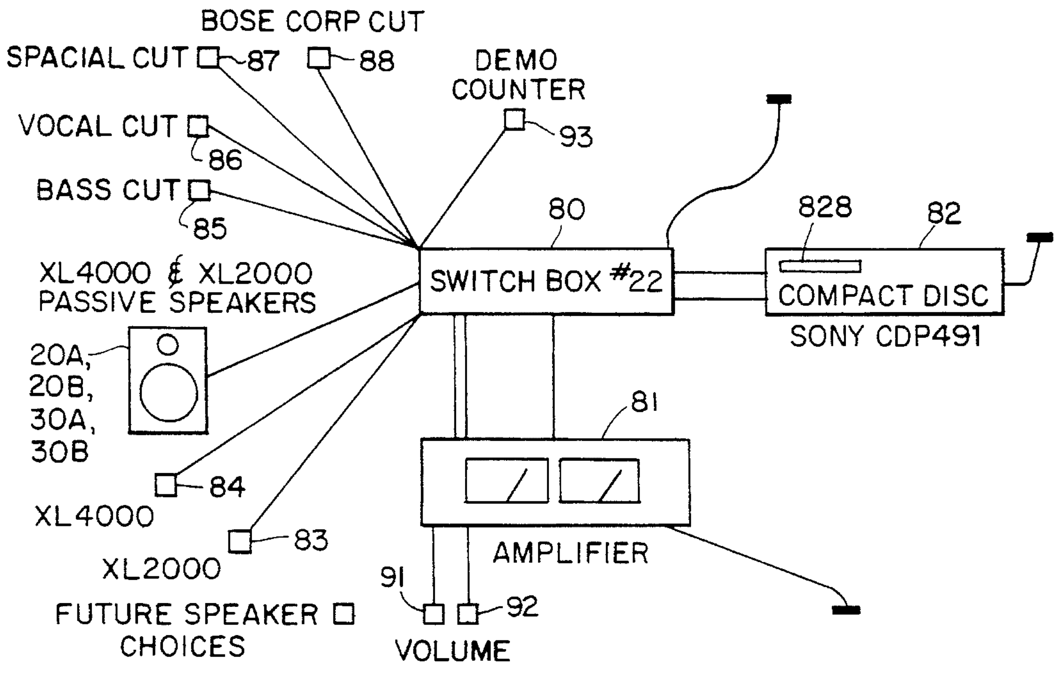
FIG. 2 is a block diagram illustrating the logical arrangement of a system according to the invention.

Referring also to FIG. 2, there is shown a block diagram illustrating the logical arrangement of a system according to the invention.

An interactive automated demonstration system according to the invention typically includes two pairs of loudspeakers 20A, 20B and 30A, 30B, typically Bose XL 4000 and XL 2000 loudspeaker systems, an integrated amplifier 81, such as a commercially available make, a compact disc player 82, preferably having direct access and less than one second start-up time, such as the Sony CDP 491, an automated switching unit 80 having six large flashing LED push-buttons, two red 83 and 84 for selecting a loudspeaker pair, four green 85, 86, 87 and 88 for selecting functions and two illuminated blue push-button switches 91 and 92 for volume control. A system timer, such as the commercially available Radio Shack RS 63-892 coacts with the apparatus to allow a consumer to select a speaker pair for demonstration, identify the type of music the consumer prefers and control volume. Actuation of a red switch selects a speaker pair for demonstration. Actuation of a green push-button switch selects a track on the CD corresponding to the desired type of musically furnishing a track selection signal initiating scan of the track with the desired type of music there. Actuation of a red push-button switch connects a selected speaker pair to the integrated amplifier.

Figure 3:
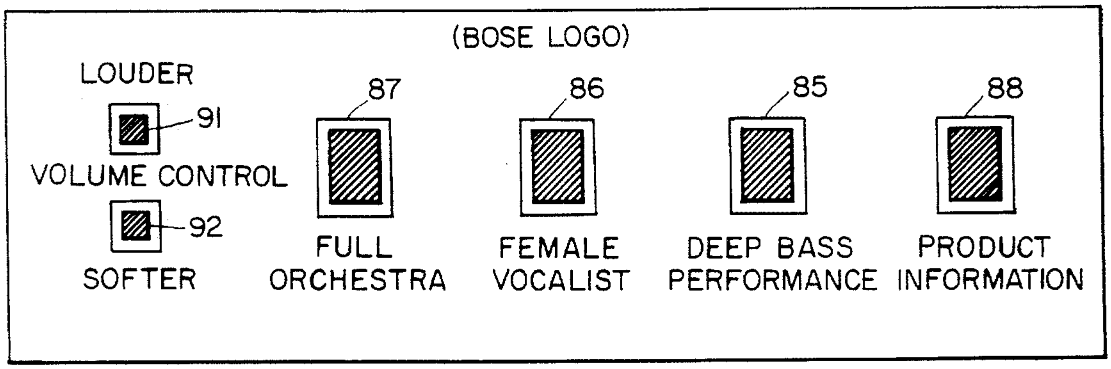
FIG. 3 illustrates a switching panel having four function push buttons and two volume control push buttons.

A demonstration counter 93 records the number of times a consumer actuates a red push-button switch. FIG. 3 shows a typical array of push-button switches. The red speaker selection push-button switches are typically located just to the right of speakers 30A and 20A, respectively, for selecting typically the Bose Model 4000 and Bose Model 2000 speaker pairs, respectively. As indicated in FIG. 2, automated switching unit or controller 80, integrated amplifier 81 and compact disc player 82 have a-c power cords that plug into conventional a-c outlets.

Having discussed the physical arrangement of an interactive automatic loudspeaker demonstrator, the mode of operation will be described in connection with a specific example.

Figure 4:
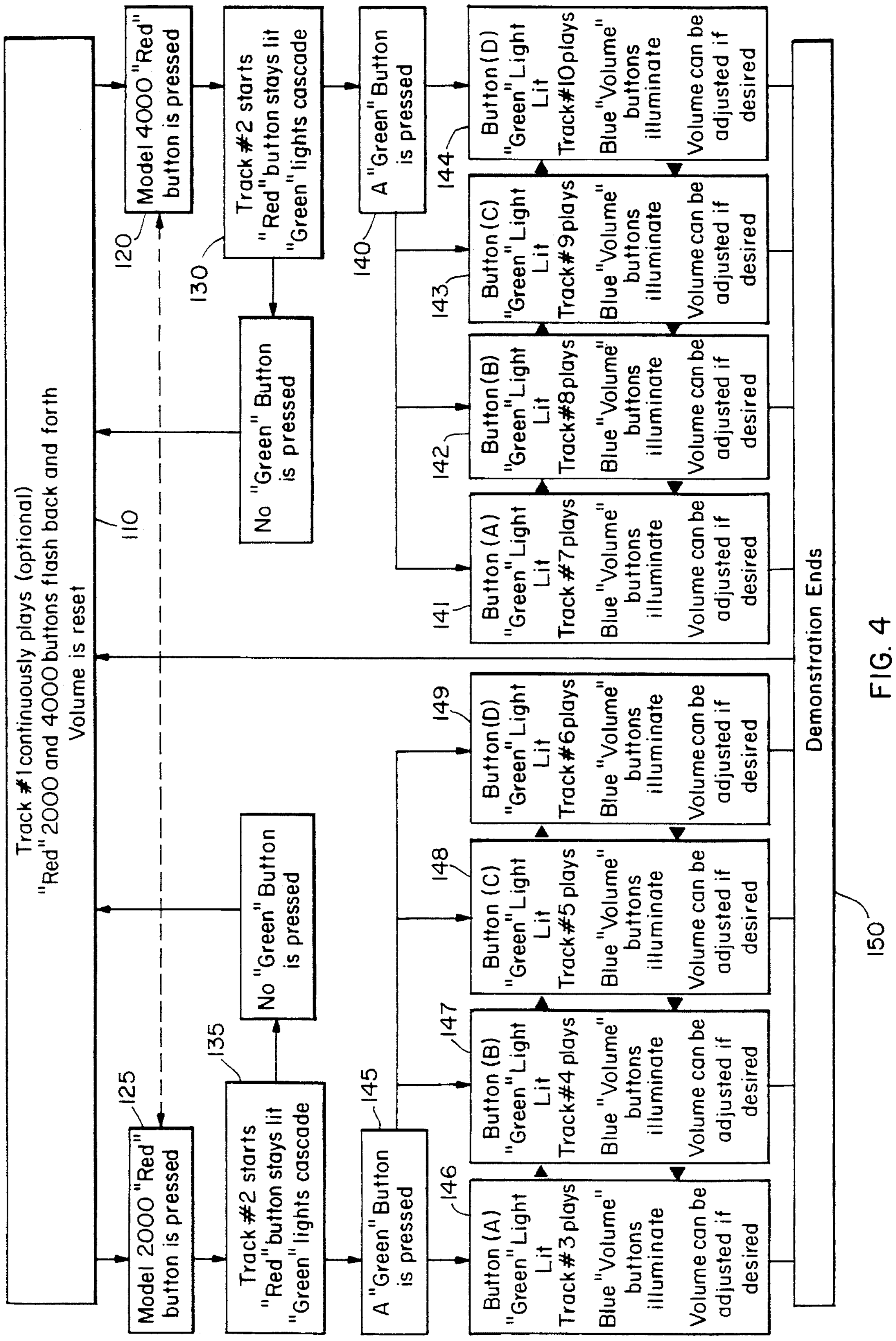
FIG. 4 is a flow chart of an automated loudspeaker demonstration.

Referring to FIG. 4, there is shown a flow diagram helpful in understanding the mode of operation of the invention.

Step 110 involves continuously and repeatedly transmitting an audible first message to encourage consumers to operate the display. The message is typically recorded on track one of the disc 82D on CD player 82. A typical first message is:

> We are proud to offer consumers stereo speakers from Bose. Bose Corporation is an American Company, as well as one of the most trusted names in high quality audio products around the world.
>
> If you would like to audition a pair of these speakers—press the flashing red button which represents that model. Then, press one of the four flashing green buttons in the center of the display that best represents the kind of music or information you wish to hear.
>
> At anytime during your demonstrations you may adjust the volume with the illuminated blue buttons and switch to the other pair of speakers by pressing its corresponding red button.

When the consumer presses a red button in steps 120 or 125, it stops flashing and remains illuminated during the demonstration. Then, the four green buttons on the automated switching unit flash sequentially left to right while transmitting a second audible message recorded on track 2 of CD 82D through the selected pair of loudspeakers in steps 130 or 135.

A typical second message is:

> Now select one of the flashing green buttons that represents the type of music you wish to audition . . . (7 second pause) . . . Are you having trouble? . . . Please push one of the flashing green buttons that represents the type of music you wish to audition. (7 second pause).

If no green button is pressed, the apparatus returns to the first step 110. When a green button is pressed in step 140, in the selected one of steps 141–144 and 146–159, the selected pair of loudspeakers reproduces the voice message and music on the corresponding track on compact disc 82D.

Each of tracks 3–10 typically have a 5-second music cut followed by an explanatory message. Typical messages follow.

For track 3, "The musical passage you've just listened to through the Bose Model 2000 was from the GRP label, off the in The Digital Mood compact disc ..... To hear more music or product information, press one of the other three green buttons."

For track 4, "The musical passage you've just listened to through the Bose Model 2000 was from the GRP label, off Diane Schuur's (Talkin' 'Bout You) compact disc . . . To hear more music or product information, press one of the other three green buttons."

For track 5, "The musical passage you've just listened to through the Bose Model 2000 was from the GRP label, off Michael Paulo's 'Fuse Box' compact disc . . . To hear more music or product information, press one of the other three green buttons."

For track 7, "The musical passage you've just listened to through the Bose Model 4000 was from the GRP label, off GRP's 'All-Star Big Band' compact disc . . . To hear more music or product information, press one of the other three green buttons."

For track 8, "The musical passage you've just listened to through the Bose Model 4000 was from the GRP label, off Patti Austin's 'Love is Gonna Getcha' compact disc . . . To hear more music or product information, press one of the other three green buttons."

For track 9, "The musical passage you've just listened to through the Bose Model 4000 was from the GRP label, off Billy Cobham's 'Power Play' compact disc . . . To hear more music of product information, press one of the other three green buttons."

For track 6:

The Bose Model 2000 features well matched, finely tuned, quality components which provide more natural sound reproduction.

Not only is the Model 2000 ideal for music, but home theater as well. There's no need for bulky and expensive loudspeakers, because the Model 2000 combines the benefits of much larger speakers with the advantages of a bookshelf design.

The Model 2000 is compatible with amplifiers and receivers rated from 10–90 watts per channel. Automatic protection circuitry provides long-term, uninterrupted enjoyment of music by preventing speaker overload. Syncom computer testing, a Bose exclusive, helps achieve quality control standards. Bose features a (5)-year transferable limited warranty on the Model 2000—to give their customers the confidence they expect in a quality audio product. If you'd like to hear more music press one of the other three green buttons.

For track 10:

Most speakers are designed to reproduce their best sound in a laboratory setting. In contrast, Bose uses sophisticated computer modeling to simulate real listening rooms—where speaker performance can better be determined. As a result, the Bose Model 4000 speaker is engineered to provide more natural sound in realistic settings—like your home.

Not only is the Model 4000 superb for music, but home theater as well. There's no need for bulky and expensive loudspeakers, because the Model 4000 combines the benefits of larger speakers with the advantages of a bookshelf design.

The Model 4000 is compatible with amplifiers and receivers rated from 10–100 watts per channel. Automatic protection circuity provides long-term, uninterrupted enjoyment of music by inhibiting speaker overload. Syncom computer testing, a Bose exclusive, helps achieve high quality control standards. Bose features a (5)-year transferable limited warranty on the Model 4000—to give their customers the confidence they expect in a quality audio product. If you'd like to hear more music press one of the other three green buttons.

In step 150 when the demonstration ends, the system returns to the first step 110.

The invention has a number of advantages. A consumer may audition multiple loudspeaker pairs at leisure without a sales person. The convenient storage arrangement allows the consumer to carry a desired boxed pair to the checkout counter. The stock may be easily replenished by removing an exhausted pallet and replacing with a pallet full of boxed pairs.

The system may also include an odometer-type seven-digit LCD counter 93 which advances each time a red button has been depressed while track 1 is playing as a measurement of the number of interactive automatic demonstrations.

Other embodiments are within the claims.

What is claimed is:

1. Loudspeaker demonstrating apparatus comprising:

a disc having a plurality of selectable tracks, a disc player constructed and arranged to support said disc and play selected ones of said selectable tracks, said disc player having a track selection signal input for receiving track selection signals designating a selectable track to be played, at least one loudspeaker, an amplifier coupled to said disc player, a controller and a plurality of switches, and a first of said switches coupled to said controller constructed and arranged upon actuation by said controller to connect said at least one loudspeaker to said amplifier and to select a first predetermined one of said selectable tracks for playing by said disc player to reproduce the signal recorded on the first predetermined one of said selectable tracks by said at least one loudspeaker with instructions for operating others of said plurality of switches, wherein said controller also coupled to at least a second switch upon actuation by said controller to provide a track selection signal to said disc player to select another predetermined one of said selectable tracks for playing by said disc player to reproduce the signal recorded on the another predetermined one of said selectable tracks by said at least one loudspeaker, said controller constructed and arranged to provide an initial track selection signal to said disc player selecting an initial selectable track on said disc for repeatedly playing by said disc player for reproduction by said at least one loudspeaker in the absence of selection of any others of said selectable tracks.

2. Loudspeaker demonstrating apparatus in accordance with claim 1 wherein said controller has at least a third switch upon actuation by said controller to provide a second track selection signal to said disc player to select a fourth predetermined one of said selectable tracks for playing by said disc player to reproduce the signal recorded on the fourth predetermined one of said selectable tracks by said at least one loudspeaker, and a volume controller coupled to said amplifier.

3. Loudspeaker demonstrating apparatus in accordance with claim 1 and further comprising:

a platform carrying said at least one loudspeaker and constructed and arranged to permit storage of a plurality of boxed loudspeakers, each of said boxed loudspeakers substantially the same as said at least one loudspeaker beneath said platform such that a customer may select and remove one of said plurality of boxed loudspeakers.

4. Loudspeaker demonstrating apparatus in accordance with claim 3 and further comprising:

support structure supporting said platform at a height of the order of 4 feet above the lowermost portion of said support structure.

5. A method of demonstrating a loudspeaker by playing sound selections recorded on tracks of a disc through the loudspeaker after amplification, which method includes:

connecting a loudspeaker to be demonstrated to said amplifier, selecting a first predetermined track on said disc and reproducing the signal recorded on the first predetermined track through said loudspeaker after amplification by said amplifier to reproduce audible instructions for effecting playing of others of said sound selections, selecting a second predetermined track on said disc in response to said audible instructions and reproducing the signal recorded on said second predetermined track through said loudspeaker after amplification by said amplifier, and selecting a third initial track on said disc for reproducing the signal recorded on the third initial track for reproduction by said loudspeaker in the absence of selection of any others of the tracks, and repeatedly reproducing the signal recorded on the third initial track for reproduction by said loudspeaker until there is a selection of another of said tracks.

6. Loudspeaker demonstrating apparatus in accordance with claim 1 and further including a counter for providing a count of the number of times the first predetermined one of said selectable tracks is played.

7. A method in accordance with claim 5 and further comprising counting the number of times said first predetermined track is selected.

* * * * *